United States Patent
Kopelman et al.

(10) Patent No.: US 7,212,531 B1
(45) Date of Patent: May 1, 2007

(54) APPARATUS AND METHOD FOR EFFICIENT LONGEST PREFIX MATCH LOOKUP

(75) Inventors: Yaniv Kopelman, Holon (IL); Carmi Arad, Nofit (IL); Nafea Bishara, Tarshiha (IL)

(73) Assignee: Marvell Semiconductor Israel Ltd., Yokneam (IL)

( * ) Notice: Subject to any disclaimer, the term of this patent is extended or adjusted under 35 U.S.C. 154(b) by 1052 days.

(21) Appl. No.: 10/167,005

(22) Filed: Jun. 10, 2002

Related U.S. Application Data

(60) Provisional application No. 60/333,712, filed on Nov. 27, 2001.

(51) Int. Cl.
*H04L 12/56* (2006.01)

(52) U.S. Cl. .................................................. 370/392

(58) Field of Classification Search ................ 370/389, 370/392; 709/245
See application file for complete search history.

(56) References Cited

U.S. PATENT DOCUMENTS 6,697,363 B1 * 2/2004 Carr ........................... 370/389

* cited by examiner

*Primary Examiner*—Derrick W. Ferris

(57) ABSTRACT

A search engine improves search speed and reduces required memory for a longest prefix matching (LPM) router that routes packets using IP addresses. The search engine includes a first bit vector with set bits corresponding to address ranges. A set bit counter counts the set bits in the bit vector based on a first portion of the address of the a first packet. A first next hop table contains first pointers for each of the set bits. One of the first pointers is selected based on a number of set bits counted by the set bit counter. For longer addresses, the addresses are split into address portions. The search engine includes a trie data structure that has n levels. The n levels of the trie data structure include nodes representing non-overlapping address space.

210 Claims, 10 Drawing Sheets

FIG. 7 bit sequence: 1 0 1 0 1 0 0 1 0 0 0 0 0 0 0 0 (labeled 42, with arrows 45)

FIG. 8

| 1 | Next hop 0* | 46-1 |
| 2 | Next hop 001* | 46-2 |
| 3 | Next hop 0* | 46-3 |
| 4 | Next hop * | 46-4 |

(labeled 44)

FIG. 5

Forwarding Table

| Prefix | Hop Pointer |
|---|---|
| * | Default hop ptr |
| 0* | Hop ptr A |
| 001* | Hop ptr B |

FIG. 6

Address Space Ranges

| Range | Prefix |
|---|---|
| 0000-0001 | 0* |
| 0010-0011 | 001* |
| 0100-0111 | 0* |
| 1000-1111 | * |

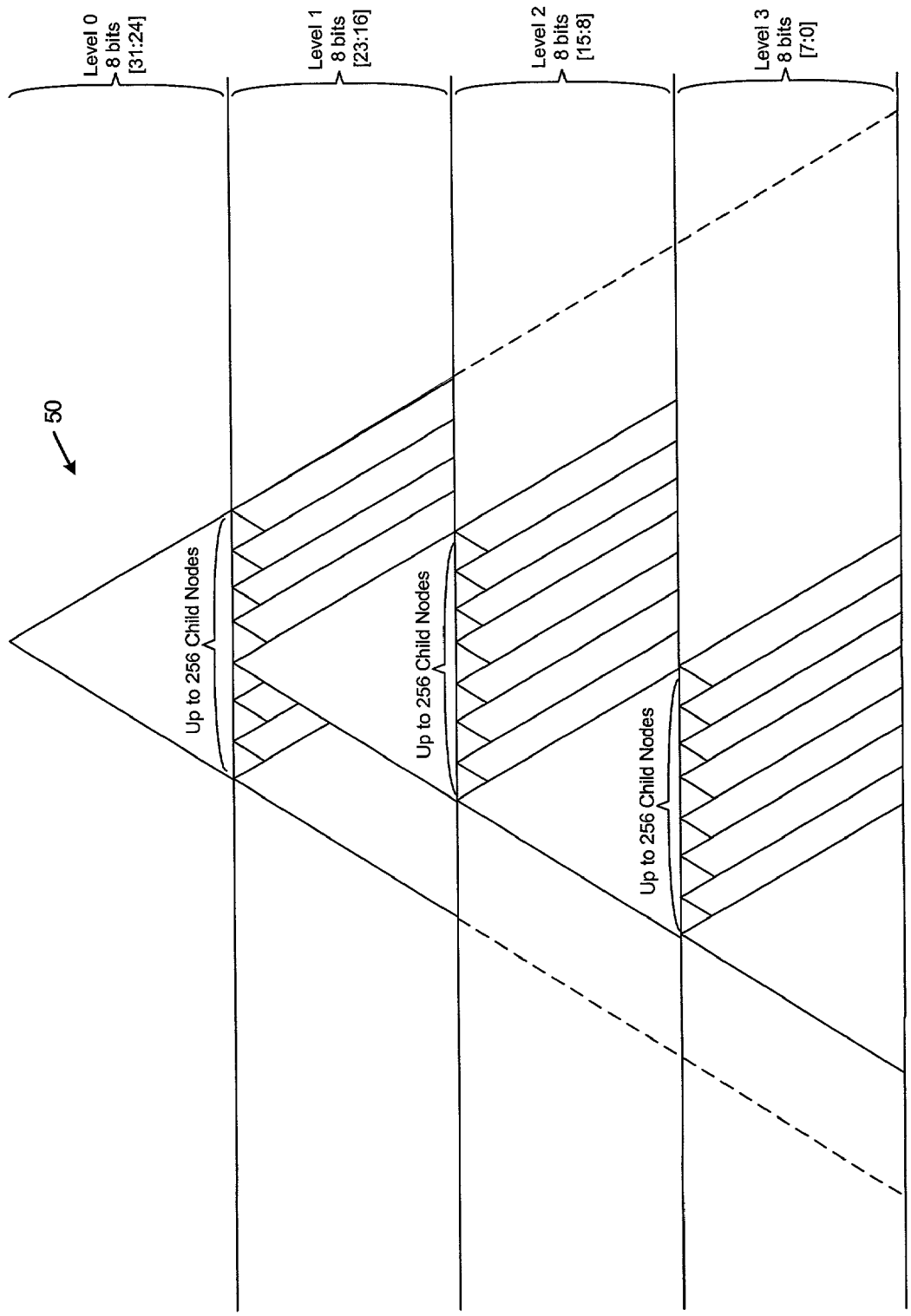

APPARATUS AND METHOD FOR EFFICIENT LONGEST PREFIX MATCH LOOKUP

CROSS-REFERENCE TO RELATED APPLICATIONS

This application claims the benefit of U.S. Provisional Application No. 60/333,712, filed Nov. 27, 2001, which is hereby incorporated by reference.

FIELD OF THE INVENTION

The present invention relates to network routers and switches, and more particularly to search engines for network routers and switches that employ longest prefix matching (LPM) of packet IP addresses.

BACKGROUND OF THE INVENTION

Routers and layer-3 switches read an IP address of packets and route the packets according to destination address. The packet is received on an incoming link of the router. The router selects an outgoing link or next hop based on the destination address. When a packet is routed from a computer in California to a computer in Michigan, multiple routers typically receive and forward the packet. Each router in the path is also referred to as a hop. For most of the routers along the path, only the network part of the destination address is used to route the packet.

The router typically employs a forwarding table that includes a next hop pointer for IP addresses. The forwarding table includes two types of IP addresses: individual host IP addresses and network IP addresses. A host IP address designates one host computer. Host IP addresses are fully specified. An IPv4 host address specifies 32 bits, while an IPv6 host IP address specifies 128 bits.

A network (subnet) IP address aggregates one or more consecutive host IP addresses. Network IP addresses are specified by a prefix. For example, the IPv4 network IP address 0x123456/24 specifies all host IP addresses in the range [0x12345600, 0x123456FF]. When a packet arrives, the router looks up the IP addresses stored in the forwarding table using the packet's destination IP address. The router finds the most specific IP address according to a LPM (Longest Prefix Match) criteria. The router forwards the packet to the next hop associated with this address.

The LPM criteria states that when the search yields multiple matches (i.e. the searched IP address is contained in several subnets), the packet should be routed to the next hop associated with the network address having the longest prefix. For example, given the IPv4 forwarding table [0x123456/24, 3]; [0x1234567/28, 2]; [0x12345678, 1], a packet with destination IP address 0x12345666 is forwarded to 3 (having only one matching subnet address). A packet with destination address 0x12345677 is forwarded to 2 (having 2 matching subnet addresses and selecting the one with longest matching prefix). A packet with destination address 0x12345678 is forwarded to 1 (having 3 matching subnets and selecting the one with the longest matching prefix).

Operating or routing speed and the cost of the router hardware are very important to router design. If the forwarding table includes a next hop pointer for each individual host IP address, the forwarding table would have $2^{32}$ entries for a 32-bit IPv4 addresses and $2^{128}$ entries for a 128-bit IPv6 addresses. The search time would be too long and the amount of memory too large. To compress the forwarding table and increase speed, the forwarding table is frequently arranged using network IP addresses.

SUMMARY OF THE INVENTION

A longest prefix matching (LPM) search engine includes a first bit vector with set bits corresponding to address ranges of an address space. A set bit counter counts the set bits in the bit vector based on a first address. A first next hop table contains first pointers for each of the set bits. One of the first pointers is selected based on a number of set bits counted by the set bit counter.

In other features, the address ranges are associated with an address prefix. The set bits are associated with the address ranges. The set bit represents a lowest address of the prefix that is assigned to the address range.

In still other features, the first address is divided into n address portions. The search engine includes a trie data structure that has n levels. The n levels of the trie data structure include nodes representing non-overlapping address space. The trie data structure initially searches at a first level using a first address portion. The first address portion contains consecutive most significant bits of the address. The set bit counter counts the set bits of the first bit vector using the first address portion.

In yet other features, the first pointers include next hop pointers and next bucket pointers. If one of the next hop pointers is output by the next hop table, the search is terminated and the router routes a first packet based on one of the next hop pointers.

The search engine further includes a second bit vector and a second next hop table that are associated with one of the next bucket pointers. The set bit counter counts set bits in the second bit vector based on a second address portion. The second next hop table outputs one of a next hop pointer and a next bucket pointer based on a second number of set bits counted by the set bit counter.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 illustrates a forwarding table for the exemplary 4-bit address space of FIG. 4;

FIG. 6 is a table illustrating address ranges for the exemplary 4-bit address space;

FIGS. 7 and 8 illustrate bit vector and next hop data structures;

FIG. 9 illustrates a trie data structure for handling a 32-bit address space;

DETAILED DESCRIPTION OF THE PREFERRED EMBODIMENTS

Figure 1B:
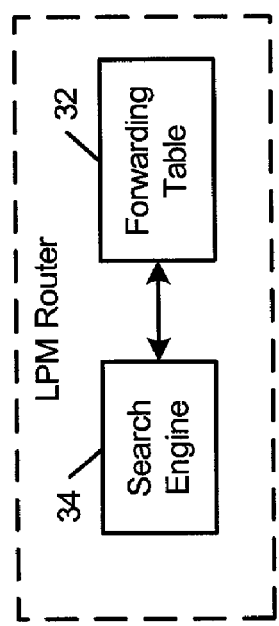
FIG. 1B is a functional block diagram of the router of FIG. 1A including a search engine and a forwarding table.

The following description of the preferred embodiment(s) is merely exemplary in nature and is in no way intended to limit the invention, its application, or uses. For purposes of clarity, the same reference numbers will be used in the drawings to identify the same elements.

Figure 1C:
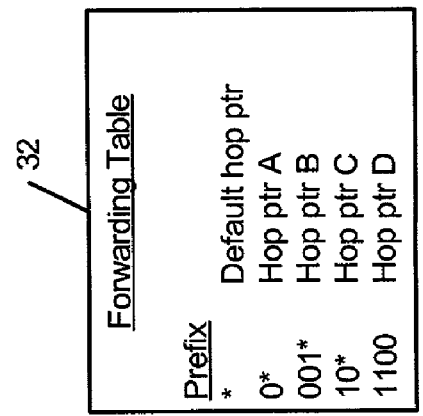
FIG. 1C illustrates an exemplary forwarding table for the network of FIG. 1A.
Figure 1A:
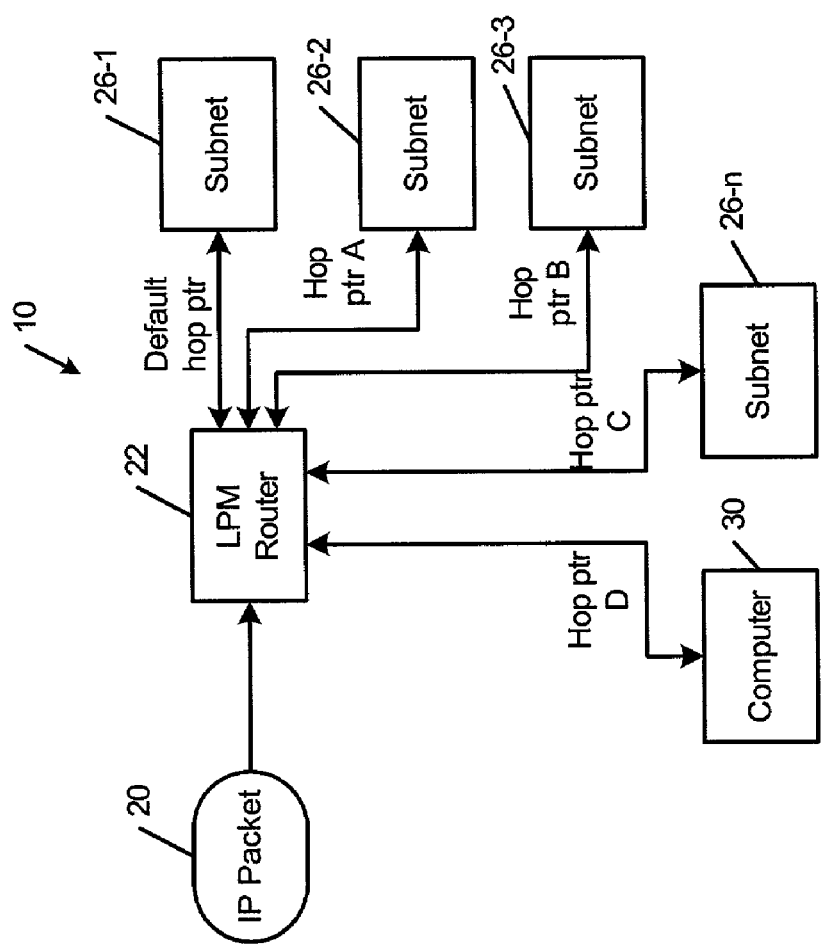
FIG. 1A is a functional block diagram of an exemplary network topology including a longest prefix match (LPM) router according to the prior art.

Referring now to FIGS. 1A, 1B and 1C, an exemplary network 10 is shown. An IP packet 20 is received by a LPM router 22 according to the prior art. A header of the packet 20 is used by the router 22 to route the packet 20 to one or more subnets 26-1, 26-2, 26-3, . . . , and 26-n, computers 30 or any other network devices. The header typically contains a source address, destination address, and other information. The router 22 includes a forwarding table 32, which is a data structure that includes a list of address prefixes. While the present invention will be described in conjunction with a router, other network devices that utilize LPM criteria are contemplated. A search engine 34 of the router 22 matches portions of the header (such as the destination address) of the packet 20. The searched header portions may contain one or more fields or portions of fields of the header. While the present invention will be described below using a destination address of the header, skilled artisans will appreciate that other header portions may be utilized.

The LPM router 22 selects the longest prefix in the forwarding table 32 that matches the searched address. In a preferred embodiment, the IP packets 20 are IPv4 packets that contain a 32-bit address. However, the invention applies to other address spaces that require longest prefix match, such as IPv6. A next hop pointer that is associated with a longest prefix that matches the header portions is used to route the packet 20.

An example forwarding table 32 for a 4-bit address space is shown in FIG. 1C. The LPM router 22 stores the following address prefixes: * (a default route—the subnet 26-1), 0* (all addresses with 0 as their MSb—the subnet 26-2), 001* (all addresses having three MSbs equal to 001—the subnet 26-3), and 10* (all addresses having two MSbs equal to 10—the subnet 26-n) and 1110 (an exact address—the computer 30). Continuing with the above example, an address 0001 is matched to a forwarding table entry 0*. An address 0010 is matched to a forwarding table entry 001*. An address 1010 is matched to a forwarding table entry 10* and an address 1100 is matched to a forwarding table entry *.

Figure 2B:
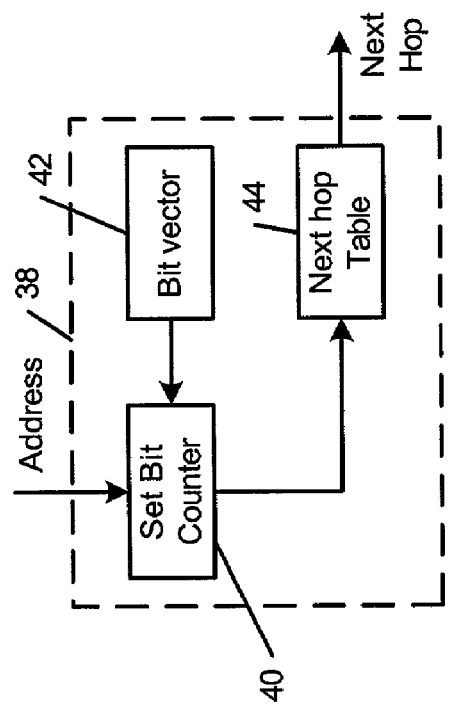
FIG. 2B is a simplified functional block diagram of a single-stage LPM search.
Figure 2A:
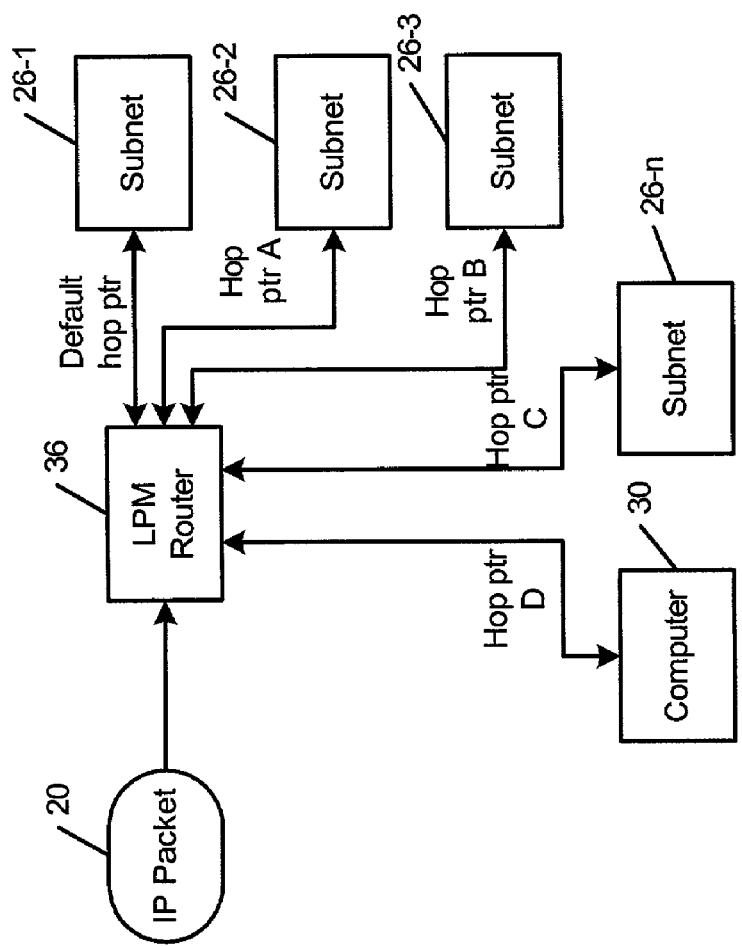
FIG. 2A is a functional block diagram of an exemplary network topology including a LPM router according to the present invention.

Referring now to FIGS. 2A and 2B, an LPM router 36 according to the present invention is shown. A search engine 38 of the LPM router 36 includes a set bit counter 40 that receives an address of the packet 20. The set bit counter 40 uses the address to count set bits of a bit vector data structure 42. The set bit counter 40 outputs the number of set bits for the address to the next hop data structure or table 44, which outputs a corresponding next hop pointer. The next hop pointer is used to route the packet.

As can be appreciated, the exemplary LPM router 36 stores address prefixes rather than exact addresses. The LPM router 36 can also store host addresses. In other words, the LPM router 36 can store both subnetwork and host addresses.

The search engine 38 minimizes the search time and forwarding table space requirements. The search engine 38 allows incremental updates of the forwarding table so that the search process is not blocked for long periods. The search engine 38 also allows synchronization of forwarding tables among several routers and is easy to implement in hardware.

Figure 3:
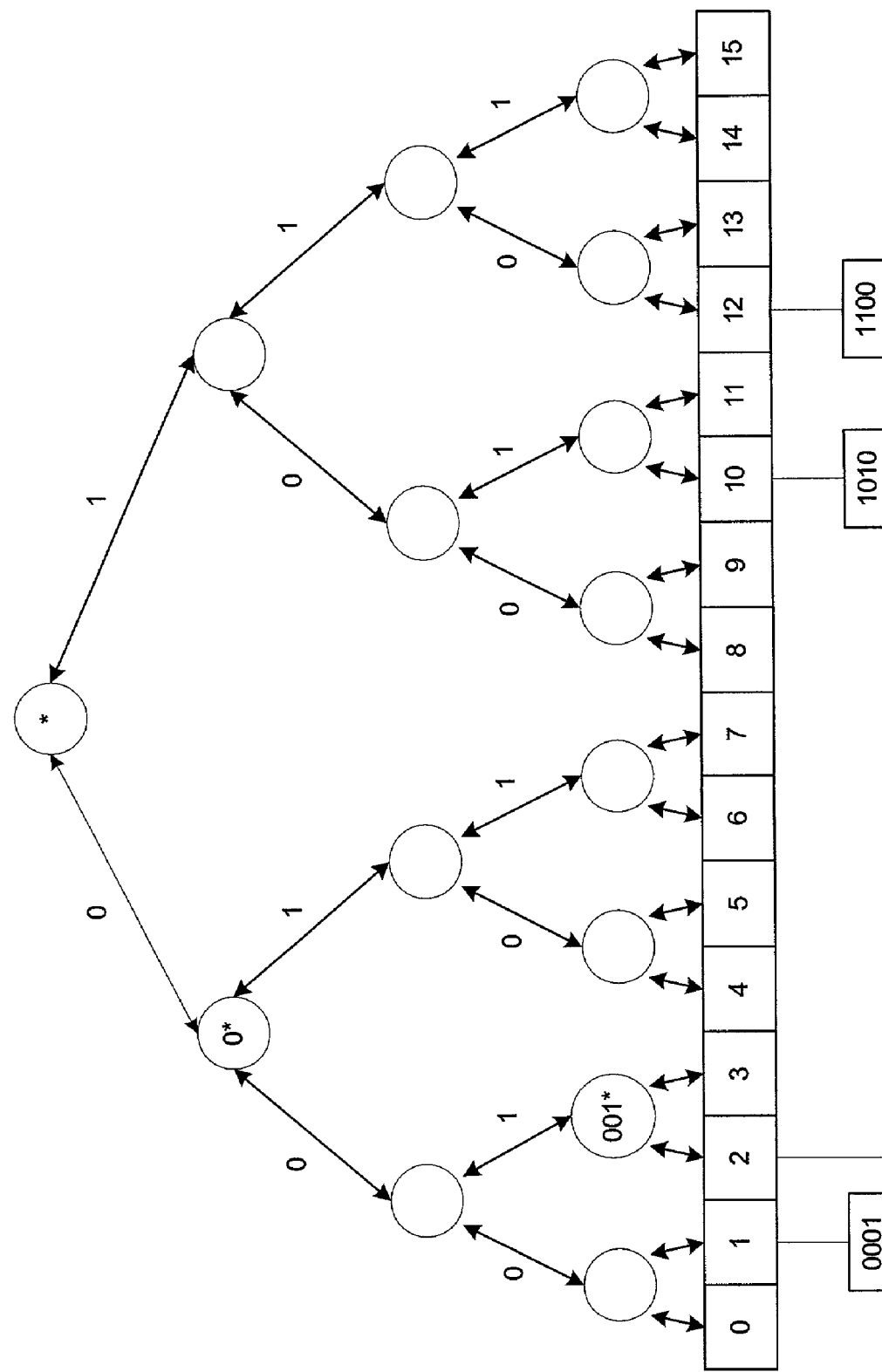
FIG. 3 illustrates a bit vector data structure for a 4-bit address space.
Figure 4:
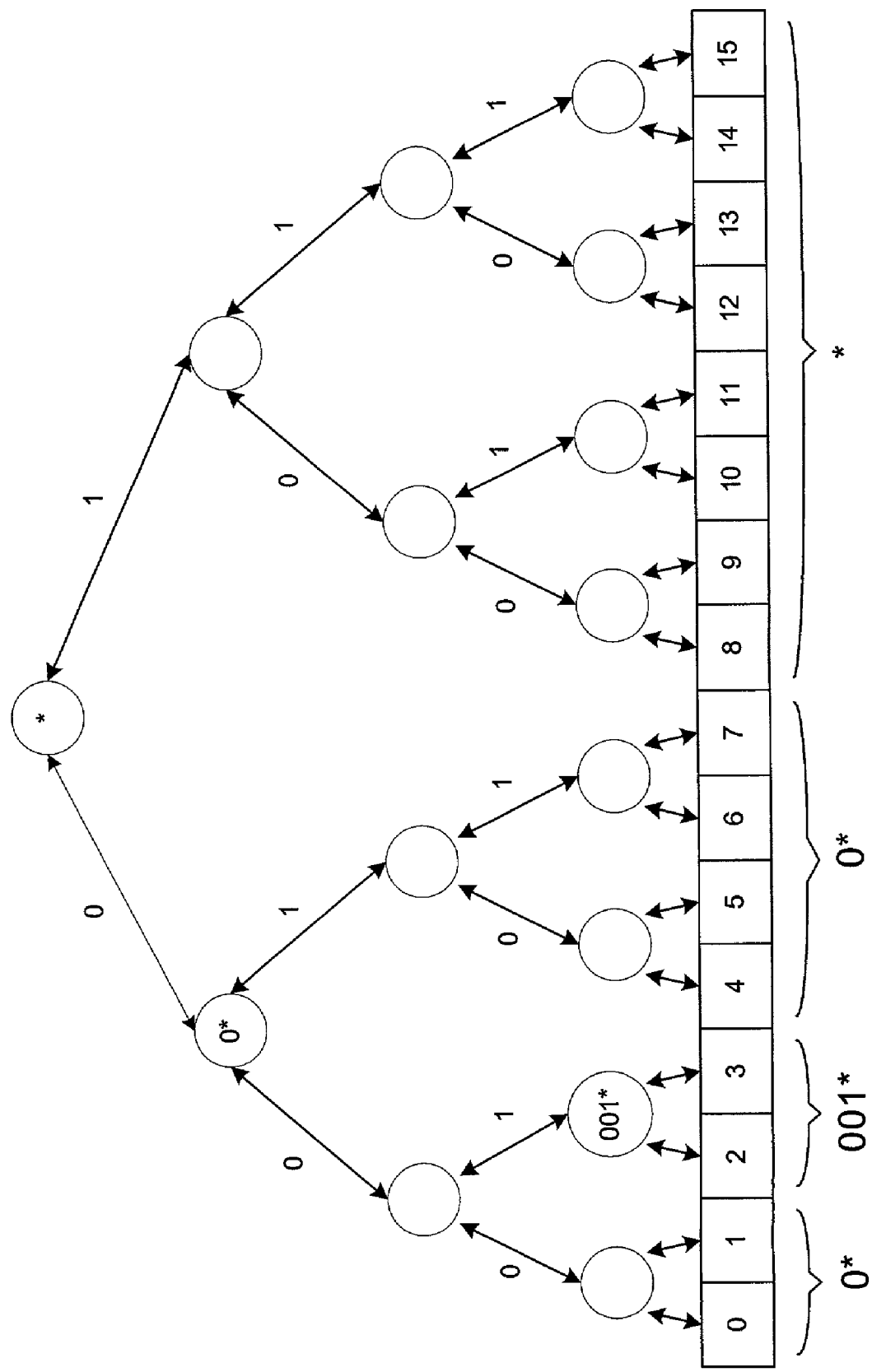
FIG. 4 illustrates a bit vector data structure for the 4-bit address space with exemplary prefixes that are associated with next hop pointers.

Referring now to FIGS. 3 and 4, an example address space is addressed by 4 bits and includes 16 different addresses. A bit vector is $2^4$ long and covers 0000 to 1111. The prefix 0* covers the address range 0000–0011. Similarly, the prefix 01* covers the address range 0100–0111. The term "covering" means that a search for an address in the range 0100–0111 should be matched to the next hop associated to prefix 01* as shown in FIG. 4. The bit vector is $2^4=16$ bits long and is arranged in order from 0000 binary to 1111 binary. The bit vector is split into four consecutive address ranges as shown for 3 prefixes used in this example.

An exemplary next hop table that is shown in FIG. 5 contains 3 prefixes: * (the default route), 0* and 001*. The prefixes split the address space into 4 address ranges as shown in FIG. 6. A first range 0000–0001 is associated with prefix 0*; a second range 0010–0011 is associated with prefix 001*; a third range 0100–0111 is associated with (again) prefix 0*; and a fourth range 1000–1111 is associated with the default route (prefix *).

The LPM rule is applied so that address spaces that are covered by more than one prefix are associated with the longest prefix covering that range. An important consequence of the LPM rule is that more than a single address range can be associated with the same prefix (as can be observed for prefix 0*) in FIG. 6. However, N prefixes will create less than or equal to 2N−1 different address ranges Referring now to FIG. 7, an exemplary bit vector data structure 42 (or bit vector) for the example 4-bit address space is shown. Set bits 45 are set equal to 1's. In FIG. 8, a next hop data structure or table 44 (or next hop pointer) is shown. The next hop table 44 has a next hop pointer 46-1, 46-2, 46-3 and 46-4 for each set bit. The set bit counter 40 of FIG. 2B receives the address of the packet 20 and counts the number of "1" bits (inclusive) to the left in the bit vector 42. The number of "1" bits is used to select the next hop pointer in the next hop table 44.

The search engine 38 assigns a next hop pointer to every address range. The search engine 38 receives a given address and identifies the address range including the address. A next hop pointer that is associated with the identified range is selected. The bit vector 42 reserves a bit for every address in the address space. The set bits are used to indicate the lowest address of each address range.

The table of next hop pointers 56 holds the next hop pointer for each address range. If an address equal to 1010 is received, the number of set bits in the bit vector is counted from position 1010 down to position zero (inclusive). In this example, there are 4 set bits. Therefore, the 4th next hop pointer is selected. The LSb in the bit vector 42 is set by default (the bit corresponding to address 0) because the address space contains at least one address range.

The search mechanism for IPv4 addresses is similar to the example described above. IPv4 addresses span $2^{32}$ addresses. Therefore, the approach set forth above can be expanded from 4 to 32 bits (and any other space, particularly, 128 bits address space) if sufficient memory and response times are present. However, modifications that will be described below are preferably made to improve efficiency when handling 32-bit or larger addresses.

Referring now to FIG. 9, to limit the size of the bit vector (and also maintain relatively small next hop tables), a trie data structure 50 (or a trie of buckets) is constructed. In binary tries, the value of successive bits in the address determines a path from the root to lower search levels. A binary trie is a tree with paths determined by the data that is stored. The number of bits that are required to identify a next hop pointer depends on the values in the prefixes. Searches are terminated when a next hop pointer is encountered. This implies that search time, as well as the depth of the trie data structure 50, is proportional to the length of the search key or address. Updates are also easier when using binary tries as compared with binary trees.

Every bucket or node in the trie data structure 50 has the same structure as in the 4-bit example described above. For 32-bit addresses, as an example, each bucket can be searched by 8 bit address portions, has a bit vector with a length equal to 256 bits and a next hop table with 2 to 256 lines. In order to cover the whole IPv4 address space, the buckets are nodes in a 4 level trie that is illustrated in FIG. 9. In the trie data structure 50, nodes on the same level cover non-overlapping address spaces associated with the four address portions. Every node may have at most 256 child nodes. A prefix is stored in a node (or bucket) that covers the prefix's address space and that is positioned in a level that matches the prefix length. Other portioning of IP addresses in additional to {8,8,8,8} are contemplated.

For example, prefix 0x0A0A/16 is stored in a level 1 node covering the address space 0x0A0A0000-0x0A0AFFFF. The root node (level 0 bucket) holds a pointer to the level 1 node. The convention 0x0A0A/16 means that the 16 MSbs from the address 0x0A0A . . . (hexadecimal format) are used. In order to maintain the tree structure, the next hop table of a node must hold pointers to lower level buckets or nodes in the tree data structure 50 (in addition to "real" next hop pointers). In other words, the next hop tables 44 contain two types of pointers: next hop pointers and next bucket pointers.

For larger address sizes such as 32-bit or larger, searches are performed by breaking the IP address into two or more address portions with blocks of bits. The optimal split is a function of the width of the memory bus, the number of accesses allowed and the length of the address space. For a 32-bit address and a 32-bit memory bus, four octets are preferred. Blocks are used from the most significant block to the least significant block to iteratively traverse the trie data structure 50 starting from the root level (level 0) and ending at level 3. A search in a node may produce a next hop pointer or a next bucket pointer. When a next hop pointer is encountered, the search is complete and the remaining IP address portion blocks are not used. When a next bucket pointer is encountered, the next IP block is used as a search index to the pointed bucket. The "next bucket" pointer creates a new address range in the address space that is covered by the selected bucket. The next bucket pointer increases the next hop table size by 1 or 2 entries.

Figure 10:
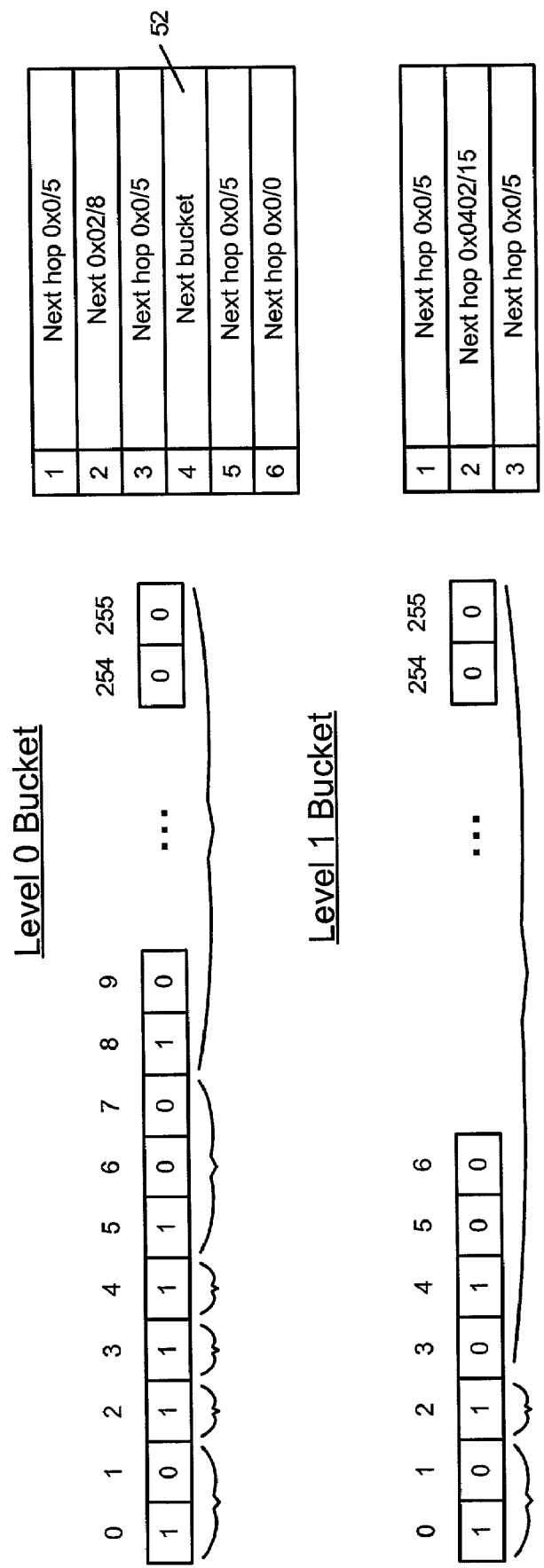
FIG. 10 illustrates bit vectors and next hop tables for level 0 and level 1 of a 32-bit address space example.

Referring now to FIG. 10, an example address space and forwarding table includes the following prefixes: 0x0/0 (default route), 0x00/5 (0000-0* in binary format), 0x02/8 (0000-0010* in binary format), and 0x0402/15 (0000-0100-0000-001* in binary format). The prefix 0x0402/15 splits the address range covered by 0x0/5 in the root bucket. A search for 0x0401 . . . (only the 16 MSb are relevant in this example) is conducted in following steps.

The most significant IP address portion or block (0x04) is used as an index to the bit vector of the root bucket (level 0). The set bits are counted (4) and the 4th pointer 52 in the next hop table is selected. The pointer 52 is a "next bucket" pointer. Therefore, processing continues at a lower level bucket (level 1). The next address portion or octet (0x02), from the IP address, is used to index the bit vector of bucket 1. The set bits, in the bit vector, from the LSb to the address 0x02 are counted. There is only one set bit. Therefore, the 1st pointer in the next hop table of the level 1 bucket is selected. Since the selected pointer is a next hop pointer, the search is done.

Figure 11:
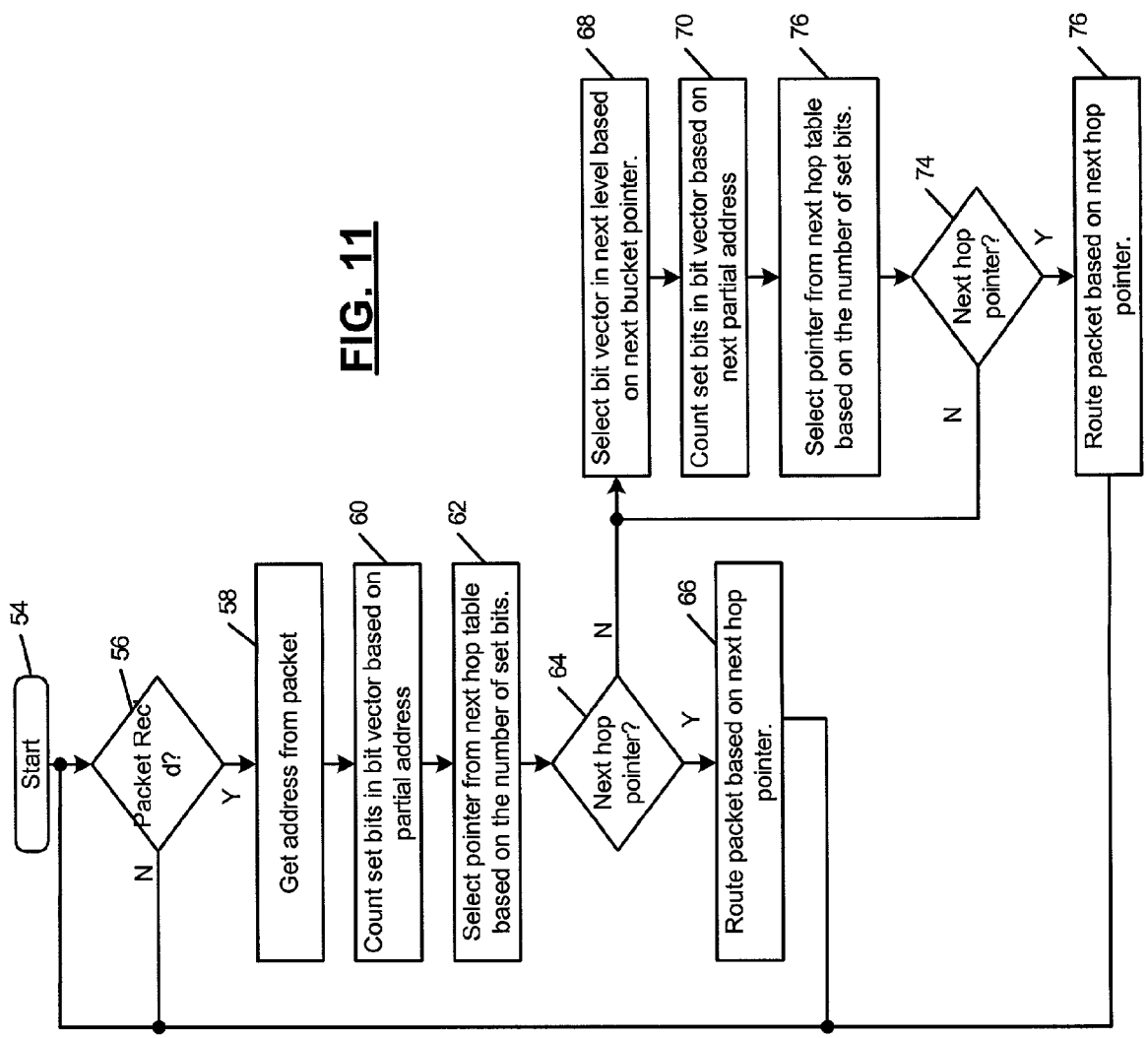
FIG. 11 is a flowchart illustrating steps performed by the LPM router.

Referring now to FIG. 11, steps performed by the search engine are shown. Control begins with step 54. In step 56, control determines whether a packet is received. If not, control loops back to step 54. Otherwise, control continues with step 58 where the address is obtained from the packet. In step 60, a counter counts set bits in the bit vector based on first address portion, such as an octet for a 32-bit address. In step 62, a pointer is selected from the next hop table based on the number of set bits. In step 64, control determines whether the pointer is a next hop pointer. If true, control continues with step 66 where the packet is routed based on the next hop pointer.

If the pointer is a next bucket pointer, control continues with step 68 and selects a bit vector in the next level based on the next bucket pointer from the prior level. In step 70, set bits are counted in the current bit vector based on a next address portion. For example, the second octet of a 32-bit address is used. In step 72, the pointer from the next hop table is selected based on the number of set bits. In step 74, control determines whether a next hop pointer is selected from the next hop table. If not, control loops back to step 68. Otherwise, control continues with step 76 and routes the packet based on the next hop pointer. Control continues from step 76 to step 56.

Figure 12:
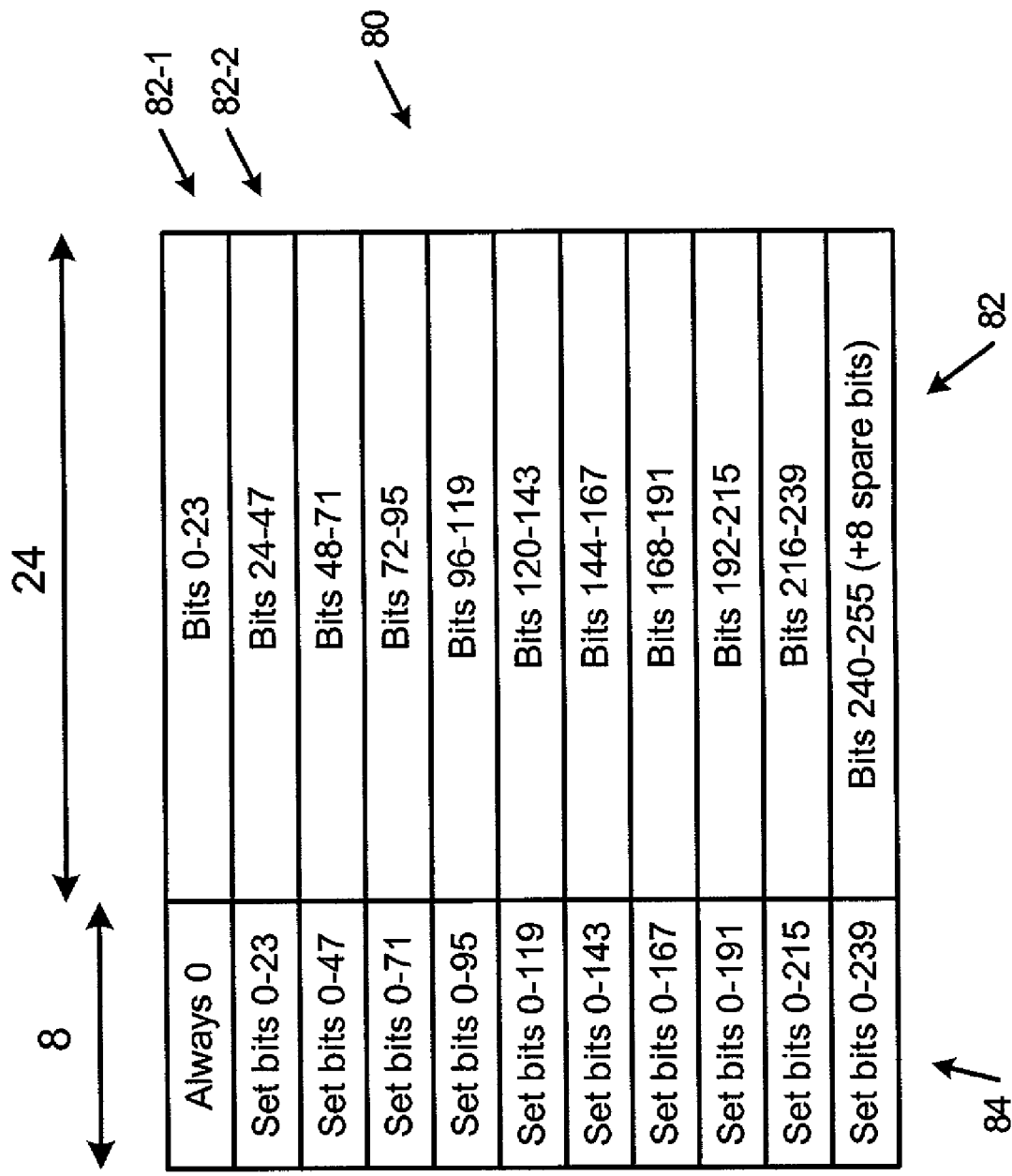
FIG. 12 illustrates an enhanced bit vector that reduces memory cycles.

Referring now to FIG. 12, an enhanced bit vector data structure 80 is shown. The data structure is design to have one access to the bucket structure to retrieve one memory line (with a 32-bit size in this example). Currently available memories typically have a width between 8 and 64 bits. As a result, more than a single memory read cycle is required to read the bit vector if the bit vector has more bits than the width of the memory (for example, the bit vector discussed above has 256 bits). The additional memory read cycles that are required increase search time. A modification to the bit vector according to the present invention limits the number of memory cycles to read the bit vector to one, regardless of the width of the memory. This modification enables a search that is limited to two memory accesses per bucket.

Assuming that a 32-bit width memory is used, the 256 bit-length bit vector is split into 11 lines 82 having a 24-bit width (the last line has unused bits). An 8-bit counter is associated with each line (for a total of 32 bits). The counter 84 holds the number of set bits in the previous lines 82 of the enhanced bit vector 80.

The address portion such as an octet is used to index the correct line in the enhanced bit vector 80. The formula is line=octet div 24 (where the 1$^{st}$ line is indexed as the 0'th line). For example, address octets having values between 0–23 address a first line 82-1. Address octets having values between 24–47 address the second line 82-2. The number of set bits from the beginning of the line up to the address octet (inclusive) is counted. The formula is column=octet % 24 (where column 0 is the LS column in every line). The number of set bits is added to the value in the counter 84. The total is used as an offset to the next hop table.

In order to provide an offset to the next hop table relative to the bucket's base address, rather than an offset relative to the base address of the next hop table, every counter (e.g. counter 84) is biased by 10-N, where N is the counter's line number (N=0, 1, . . . , 10). This formula assumes that the LSb of the bit vector is always set.

If the number of set bits in the bit vector is small, the size of the bit vector can be reduced. For a typical core Internet router, most of the buckets are small and therefore, a considerable amount of memory space can be saved by compressing the bit vector. Compressing the bit vector by replacing the bit vector with the indices of the set bits (8 bits per index for 256 bits length bit vector) provides a compression ratio of about 10% (relative to an uncompressed bit vector).

Figure 13:
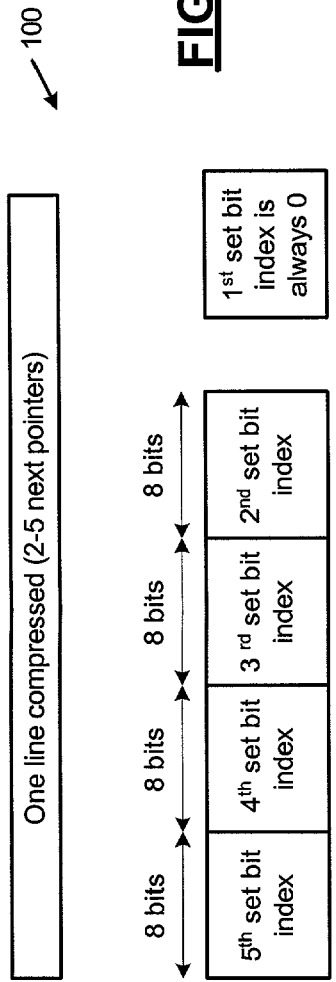
FIG. 13 illustrates one line compressed bit vector.

In a first exemplary compressed bit vector in FIG. 13, a single line indices list 100 is used to compress buckets with 2–5 next hop entries, which correspond to bit vectors having 2–5 set bits, respectively. The first set bit in a bit vector is always the LSb and therefore, its index is known. The indices of the other set bits are written to a 32-bit line, allocating an octet per index. If the number of the set bits is less than 5, a zero is written in the "empty" octets.

Figure 14:
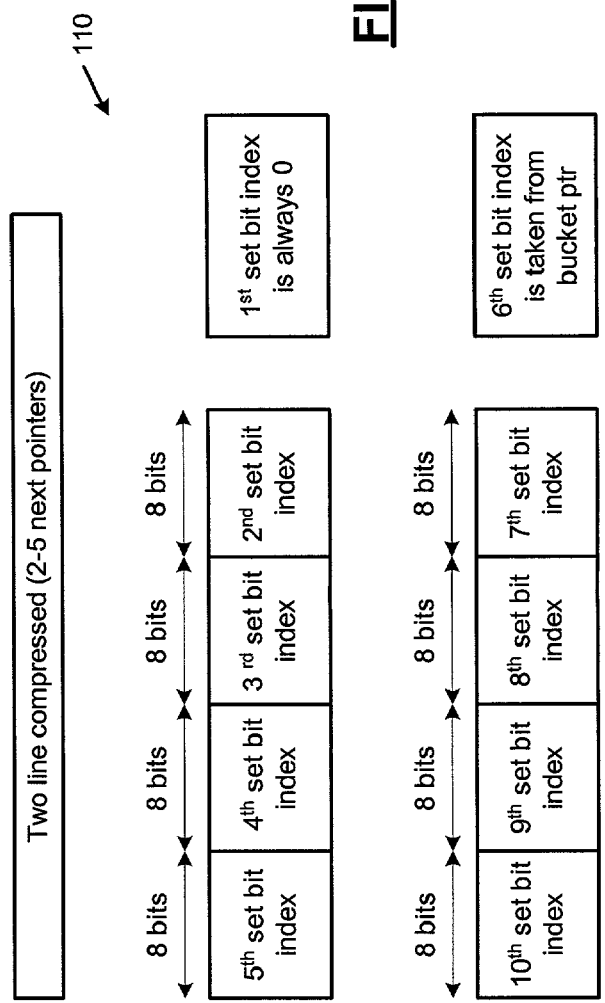
FIG. 14 illustrates a two line compressed bit vector.

A search is conducted by counting the number of indices in the compressed bit vector satisfying IP address block <=index, and excluding zero indices. In a second bit vector in FIG. 14, a double line indices list 110 is used for buckets with 6–10 next hop entries. By allocating an octet to an index of a set bit, up to 8 indices can be stored in two 32-bit lines. The index of the 1$^{st}$ set bit is always zero. The indices of set bits 2–5 are written to the 1$^{st}$ line. The 6th index is held in the parent level next bucket pointer. The indices of set bits 7–10 are written to the 2$^{nd}$ line. If the number of set bits is smaller than 10, a zero is written in the "empty" octets of the 2$^{nd}$ line.

A search is conducted by deciding whether the 1$^{st}$ or the 2$^{nd}$ line of the compressed bit vector should be read. This is done by comparing the IP address block to the 6$^{th}$ index (stored in the parent next bucket pointer). If IP address block <6th index then the 1st line is read. Otherwise, the 2$^{nd}$ line is read. The offset to the next pointer table is obtained by counting the number of indices that are smaller or equal to the IP address block (excluding zero indices). If 2$^{nd}$ line has been read 5 should be added to the offset (because the offset should index the "higher" half of the next hop table). With the incorporation of compressed bit vectors, four types of pointers populate the next hop table: a pointer to a single line compressed bucket, a pointer to a double line compressed bucket, a pointer to a regular bucket and a next hop pointer.

In one implementation, the normal bit vector has a size of 256 bits and the compressed bit vectors are 32 or 64 bits. The 32-bit compressed bit vector is capable of indexing "next . . . " tables of up to 5 entries. The 64-bit compressed bit vector is capable of indexing "next . . . " tables of up to 10 entries and is used when the table size is 6–10 entries.

To implement a compressed bit vector, an ordinary 256-bit bit vector is constructed. The number of '1's in the bit vector are counted. If number of '1's is less that 6, a 32-bit compressed bit vector is constructed. If the number of '1's is less than 11, a 64 bit compressed bit vector is constructed Otherwise a normal (uncompressed) bit vector is constructed.

Constructing and searching a 32-bit compressed bit vector is performed as follows. The 32 bits are divided into 4 octets and are optionally named Octet 1, Octet2, . . . , and Octet4. For each octet, the indices of the '1's in the corresponding bit vector are written. The zero bit in the bit vector is preferably set by default and need not be written into the octet. If the number of set bits in the normal bit vector is smaller than 5, the empty octets are filled with zeroes. The zero index is invalid because this index is set by definition. Therefore, zero can be used as a filler symbol.

For example, assume that the indices of the set bits are: 0, 2, and 5 (0 is mandatory). In this example, the address space of the bucket is divided into 3 intervals: {[0,1]; [2,4]; and [5,255]}. A 32-bit compressed bit vector is used and is filled as follows: Octet1=2, Octet2=5, Octet 3 and 4=0 (fillers).

A search for IP address octet=123 is conducted as follows. The "next bucket" pointer that points to this pointer indicates that the pointed bucket is a 32-bit compressed bit vector. The bit vector is read.

Set i=0.

For every octet in the bit vector (exclude octets equal to zero) {i+=(OCTET[j]<=123) ? 1: 0}.

Pick the i$^{th}$ entry in the next hop pointers table.

Constructing and searching a 64-bit compressed bit vector is performed as follows. The 64 bits are divided into 8 octets and are optionally named Octet 1, Octet2, . . . , Octet4, Octet6, . . . , Octet9. Note that Octet5 is omitted. The indices of the '1's are written in the bit vector. The indices of the 1st and the 6'th '1' s are skipped. Note that index 0 (i.e. the 1st '1') in the bit vector is always set and, therefore, need not be written into an octet. The index of the 6'th '1' is written to the "next bucket" pointer that points to this bucket. If the number of set bits in the normal bit vector is smaller than 10, the empty octets are filled with zeroes.

For example, assume that the indices of the set bits are: 0, 2, 5, 10, 11, 12, and 20. In other words, the address space of the bucket is divided into 7 intervals: {[0,1]; [2,4]; [5,9]; [10,10]; [11,11]; [12,19]; and [20,255]}. A 32-bit compressed bit vector is filled as follows: Octet1=2, Octet2=5, Octet3=10, Octet4=11, Octet6=20, Octet7=0, Octet8=0, and Octet9=0.

The bucket's parent pointer carries Octet5=12. A search with IP address octet=15 is conducted as follows. The "next bucket" pointer that points to this pointer indicates that the pointed bucket is a 64-bit compressed bit vector. Note that Octet5 is contained as a field in the next bucket pointer data structure. If Octet5 is less than 15, the 1st 32 bits of the bit vector (Octets[1:4]) are read. The offset into the "next hop" pointer table is calculated as if the bit vector is a 32-bit compressed bit vector. Otherwise, the 2nd 32 bits of the bit vector (Octets[6:9]) are read. The offset into the "next hop" pointers table is calculated as if the bit vector is a 32-bit compressed bit vector+5.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A longest prefix matching search engine, comprising:
a first bit vector including set bits representing address ranges of an address space;
a set bit counter that counts said set bits in said bit vector based on a first address; and
a first next hop table containing first pointers for each of said set bits, wherein one of said first pointers is selected based on a number of set bits counted by said set bit counters,
wherein said first bit vector includes:
a plurality of lines each including an address portion that includes said set bits; and
a counter portion that includes a number of said set bits in a previous line of said first bit vector.

2. The search engine of claim 1 wherein said address ranges are associated with an address prefix.

3. The search engine of claim 2 wherein each of said sets bit is associated with one of said address ranges.

4. The search engine of claim 2 wherein said set bit represents an address range of said prefix and wherein said set bit is positioned in said bit vector at a lowest address of said address range.

5. The search engine of claim 4 wherein said first address is divided into n address portions.

6. The search engine of claim 5 wherein said first address is a 32-bit address that is divided into four octets.

7. The search engine of claim 1 wherein said first pointers include at least one next hop pointer that is used to route a packet.

8. The search engine of claim 2 wherein said search engine includes a trie data structure that has n levels.

9. The search engine of claim 8 wherein said n levels of said trie data structure include trie leaf nodes representing non-overlapping address space.

10. The search engine of claim 8 wherein said trie data structure initially searches at a first level using a first address portion.

11. The search engine of claim 10 wherein said first address portion contains consecutive most significant bits of said address.

12. The search engine of claim 11 wherein said set bit counter counts said set bits of said first bit vector using said first address portion.

13. The search engine of claim 12 wherein said first pointers include next hop pointers and next bucket pointers.

14. The search engine of claim 13 wherein, if one of said next hop pointers is output by said next hop table, said search is terminated and a router routes a first packet based on said one of said next hop pointers.

15. The search engine of claim 14 further comprising:
a second bit vector that is associated with one of said next bucket pointers; and
a second next hop table that is associated with one of said next bucket pointers.

16. The search engine of claim 15 wherein, if said first pointer is said one of said next bucket pointers, said set bit counter counts set bits in said second bit vector based on a second address portion.

17. The search engine of claim 16 wherein said second next hop table outputs one of a next hop pointer and a next bucket pointer based on a second number of set bits counted by said set bit counter.

18. The search engine of claim 17 further comprising additional bit vectors and next hop tables that are associated with next bucket pointers in lower levels of said trie data structure.

19. The search engine of claim 1 further comprising an enhanced bit vector that includes p counters and p partial length bit vectors, wherein each of said counters is associated with one of said partial length bit vectors.

20. The search engine of claim 19 wherein said counters are 8-bit counters and said partial length bit vectors include 24-bits.

21. The search engine of claim 20 wherein said enhanced bit vector allows a bit vector that is wider than memory bus width to be read in a single memory cycle.

22. The search engine of claim 1 further comprising a single line compressed bit vector that includes indices of set bits of said first bit vector.

23. The search engine of claim 22 wherein said single line compressed bit vector includes 32 bits and is capable of representing 256-bit bit vectors having less than 6 set bits.

24. The search engine of claim 22 further comprising a double line compressed bit vector that includes indices of set bits of said first bit vector.

25. The search engine of claim 24 wherein said double line compressed bit vector includes 64 bits and is capable of representing 256-bit bit vectors with less than 11 set bits.

26. The search engine of claim 24 wherein said pointers further include single and double line compressed pointers.

27. The search engine of claim 1 wherein said search engine routes packets using IP addresses.

28. The search engine of claim 1 wherein said first bit counter counts set bits in said first bit vector from a least significant bit of said first bit vector to a bit position in said first bit vector that is equal to an address of a packet.

29. The search engine of claim 1 wherein said search engine is implemented using software that is executed by a processor and memory.

30. The search engine of claim 1 wherein said address ranges are associated with IP addresses of a packet header and at least one other field of said packet header.

31. A longest prefix matching search engine, comprising:
first bit vector means for representing address ranges of an address space using set bits;
set bit counting means for counting said set bits in said first bit vector means based on a first address; and
first next hop table means for storing first pointers for each of said set bits, wherein one of said first pointers is selected based on a number of set bits counted by said set bit counting means,
wherein said first bit vector means includes:
a plurality of lines each including an address portion that includes said set bits; and
a counter portion that includes a number of said set bits in a previous line of said first bit vector.

32. The search engine of claim 31 wherein said address ranges are associated with an address prefix.

33. The search engine of claim 32 wherein each of said sets bits is associated with one of said address ranges.

34. The search engine of claim 32 wherein said set bit represents an address range of said prefix and wherein said set bit is positioned in said bit vector means at a lowest address of said address range.

35. The search engine of claim 34 wherein said first address is divided into n address portions.

36. The search engine of claim 35 wherein said first address is a 32-bit address that is divided into four octets.

37. The search engine of claim 31 wherein said first pointers include at least one next hop pointer that is used to route a packet.

38. The search engine of claim 32 wherein said search engine includes a trie data structure that has n levels.

39. The search engine of claim 38 wherein said n levels of said trie data structure include trie leaf nodes representing non-overlapping address space.

40. The search engine of claim 38 wherein said trie data structure initially searches at a first level using a first address portion.

41. The search engine of claim 40 wherein said first address portion contains consecutive most significant bits of said address.

42. The search engine of claim 41 wherein said set bit counting means counts said set bits of said first bit vector means using said first address portion.

43. The search engine of claim 42 wherein said first pointers include next hop pointers and next bucket pointers.

44. The search engine of claim 43 wherein, if one of said next hop pointers is output by said next hop table, said search is terminated and said router routes a first packet based on said one of said next hop pointers.

45. The search engine of claim 44 further comprising:
a second bit vector means for representing address ranges of an address space using set bits, wherein said second bit vector means is associated with one of said next bucket pointers; and
a second next hop table means for storing first pointers for each of said set bits, wherein said second next hop table is associated with one of said next bucket pointers.

46. The search engine of claim 45 wherein, if said first pointer is said one of said next bucket pointers, said set bit counting means counts set bits in said second bit vector means based on a second address portion.

47. The search engine of claim 46 wherein said second next hop table means outputs one of a next hop pointer and a next bucket pointer based on a second number of set bits counted by said set bit counting means.

48. The search engine of claim 47 further comprising additional bit vectors and next hop tables that are associated with next bucket pointers in lower levels of said trie data structure.

49. The search engine of claim 31 further comprising an enhanced bit vector that includes p counters and p partial length bit vectors, wherein each of said counters is associated with one of said partial length bit vectors.

50. The search engine of claim 49 wherein said counters are 8-bit counters and said partial length bit vectors include 24-bits.

51. The search engine of claim 50 wherein said enhanced bit vector allows a bit vector that is wider than memory bus width to be read in a single memory cycle.

52. The search engine of claim 31 further comprising a single line compressed bit vector that includes indices of set bits of a bit vector.

53. The search engine of claim 52 wherein said single line compressed bit vector includes 32 bits and is capable of representing 256-bit bit vectors having less than 6 set bits.

54. The search engine of claim 52 further comprising a double line compressed bit vector that includes indices of set bits of a bit vector.

55. The search engine of claim 54 wherein said double line compressed bit vector includes 64 bits and is capable of representing 256-bit bit vectors with less than 11 set bits.

56. The search engine of claim 54 wherein said pointers further include single and double line compressed pointers.

57. The search engine of claim 31 wherein said search engine routes packets using IP addresses.

58. The search engine of claim 31 wherein said first bit counting means counts set bits in said first bit vector means from a least significant bit of said first bit vector means to a bit position in said first bit vector means that is equal to an address of a packet.

59. The search engine of claim 31 wherein said search engine is implemented using software that is executed by a processor and memory.

60. The search engine of claim 31 wherein said search engine is implemented in a network switch.

61. A method for matching a search key to a flow entry using longest prefix matching criteria, comprising:
representing address ranges of an address space using set bits of a first bit vector;
counting said set bits in said first bit vector based on a first address;
storing first pointers for each of said set bits in a next hop table; and
selecting one of said first pointers based on a number of set bits that is counted,
wherein said first bit vector includes:
a plurality of lines each including an address portion that includes said set bits; and
a counter portion that includes a number of said set bits in a previous line of said first bit vector.

62. The method of claim 61 wherein said address ranges are associated with an address prefix.

63. The method of claim 62 wherein each of said sets bits is associated with one of said address ranges.

64. The method of claim 62 further comprising representing an address range of said prefix using said set bit, wherein said set bit is positioned in said bit vector means at a lowest address of said address range.

65. The method of claim 64 further comprising dividing said first address into n address portions.

66. The method of claim 65 wherein said first address is a 32-bit address that is divided into four octets.

67. The method of claim 61 wherein said first pointers include at least one next hop pointer that is used to route a packet.

68. The method of claim 62 further comprising providing a trie data structure that has n levels.

69. The method of claim 68 further comprising dividing said n levels of said trie data structure into trie leaf nodes representing non-overlapping address space.

70. The method of claim 68 further comprising initially searching said trie data structure at a first level using a first address portion.

71. The method of claim 70 wherein said first address portion contains consecutive most significant bits of said address.

72. The method of claim 71 further comprising counting said set bits of said first bit vector using said first address portion.

73. The method of claim 72 wherein said first pointers include next hop pointers and next bucket pointers.

74. The method of claim 73 further comprising:
terminating said search if one of said next hop pointers is output by said next hop table; and
routing a first packet based on said one of said next hop pointers.

75. The method of claim 74 further comprising:
representing address ranges of an address space using set bits in a second bit vector, wherein said second bit vector is associated with one of said next bucket pointers; and
storing first pointers in second next hop table for each of said set bits, wherein said second next hop table is associated with one of said next bucket pointers.

76. The method of claim 75 further comprising counting set bits in said second bit vector based on a second address portion if said first pointer is said one of said next bucket pointers.

77. The method of claim 76 further comprising generating one of a next hop pointer and a next bucket pointer using said second next hop table based on a second number of set bits counted.

78. The method of claim 77 further comprising associating additional bit vectors and next hop tables with next bucket pointers in lower levels of said trie data structure.

79. The method of claim 61 further comprising using an enhanced bit vector that includes p counters and p partial length bit vectors, wherein each of said counters is associated with one of said partial length bit vectors.

80. The method of claim 79 wherein said counters are 8-bit counters and said partial length bit vectors include 24-bits.

81. The method of claim 80 further comprising allowing a bit vector that is wider than memory bus width to be read in a single memory cycle using said enhanced bit vector.

82. The method of claim 81 further comprising using a single line compressed bit vector that includes indices of set bits of a bit vector.

83. The method of claim 82 wherein said single line compressed bit vector includes 32 bits and is capable of representing 256-bit bit vectors having less than 6 set bits.

84. The method of claim 82 further comprising using a double line compressed bit vector that includes indices of set bits of a bit vector.

85. The method of claim 84 wherein said double line compressed bit vector includes 64 bits and is capable of representing 256-bit bit vectors with less than 11 set bits.

86. The method of claim 84 wherein said pointers further include single and double line compressed pointers.

87. The method of claim 61 wherein said search engine routes packets using IP addresses.

88. The method of claim 61 further comprising counting set bits in said first bit vector from a least significant bit of said first bit vector to a bit position in said first bit vector that is equal to a packet address.

89. The method of claim 61 wherein said search engine is implemented using software that is executed by a processor and memory.

90. The method of claim 61 wherein said search engine is implemented in a network switch.

91. A router including a longest prefix matching search engine, comprising:
a first bit vector including set bits representing address ranges of an address space;
a set bit counter that counts said set bits in said bit vector based on a first address; and
a first next hop table containing first pointers for each of said set bits, wherein one of said first pointers is selected based on a number of set bits counted by said set bit counters,
wherein said first bit vector includes:
a plurality of lines each including an address portion that includes said set bits; and
a counter portion that includes a number of said set bits in a previous line of said first bit vector.

92. The router of claim 91 wherein said address ranges are associated with an address prefix.

93. The router of claim 92 wherein each of said sets bit is associated with one of said address ranges.

94. The router of claim 92 wherein said set bit represents an address range of said prefix and wherein said set bit is positioned in said bit vector at a lowest address of said address range.

95. The router of claim 94 wherein said first address is divided into n address portions.

96. The router of claim 95 wherein said first address is a 32-bit address that is divided into four octets.

97. The router of claim 91 wherein said first pointers include at least one next hop pointer that is used to route a packet.

98. The router of claim 92 wherein said search engine includes a trie data structure that has n levels.

99. The router of claim 98 wherein said n levels of said trie data structure include trie leaf nodes representing non-overlapping address space.

100. The router of claim 98 wherein said trie data structure initially searches at a first level using a first address portion.

101. The router of claim 100 wherein said first address portion contains consecutive most significant bits of said address.

102. The router of claim 101 wherein said set bit counter counts said set bits of said first bit vector using said first address portion.

103. The router of claim 102 wherein said first pointers include next hop pointers and next bucket pointers.

104. The router of claim 103 wherein, if one of said next hop pointers is output by said next hop table, said search is terminated and a router routes a first packet based on said one of said next hop pointers.

105. The router of claim 104 further comprising:
a second bit vector that is associated with one of said next bucket pointers; and
a second next hop table that is associated with one of said next bucket pointers.

106. The router of claim 105 wherein, if said first pointer is said one of said next bucket pointers, said set bit counter counts set bits in said second bit vector based on a second address portion.

107. The router of claim 106 wherein said second next hop table outputs one of a next hop pointer and a next bucket pointer based on a second number of set bits counted by said set bit counter.

108. The router of claim 107 further comprising additional bit vectors and next hop tables that are associated with next bucket pointers in lower levels of said trie data structure.

109. The router of claim 91 further comprising an enhanced bit vector that includes p counters and p partial length bit vectors, wherein each of said counters is associated with one of said partial length bit vectors.

110. The router of claim 109 wherein said counters are 8-bit counters and said partial length bit vectors include 24-bits.

111. The router of claim 110 wherein said enhanced bit vector allows a bit vector that is wider than memory bus width to be read in a single memory cycle.

112. The router of claim 91 further comprising a single line compressed bit vector that includes indices of set bits of said first bit vector.

113. The router of claim 112 wherein said single line compressed bit vector includes 32 bits and is capable of representing 256-bit bit vectors having less than 6 set bits.

114. The router of claim 112 further comprising a double line compressed bit vector that includes indices of set bits of said first bit vector.

115. The router of claim 114 wherein said double line compressed bit vector includes 64 bits and is capable of representing 256-bit bit vectors with less than 11 set bits.

116. The router of claim 114 wherein said pointers further include single and double line compressed pointers.

117. The router of claim 91 wherein said search engine routes packets using IP addresses.

118. The router of claim 91 wherein said first bit counter counts set bits in said first bit vector from a least significant bit of said first bit vector to a bit position in said first bit vector that is equal to an address of a packet.

119. The router of claim 91 wherein said search engine is implemented using software that is executed by a processor and memory.

120. The router of claim 91 wherein said address ranges are associated with IP addresses of a packet header and at least one other field of said packet header.

121. A router including a longest prefix matching search engine, comprising:
first bit vector means for representing address ranges of an address space using set bits;
set bit counting means for counting said set bits in said first bit vector means based on a first address; and
first next hop table means for storing first pointers for each of said set bits, wherein one of said first pointers is selected based on a number of set bits counted by said set bit counting means,
wherein said first bit vector means includes:
a plurality of lines each including an address portion that includes said set bits; and
a counter portion that includes a number of said set bits in a previous line of said first bit vector.

122. The router of claim 121 wherein said address ranges are associated with an address prefix.

123. The router of claim 122 wherein each of said sets bits is associated with one of said address ranges.

124. The router of claim 122 wherein said set bit represents an address range of said prefix and wherein said set bit is positioned in said bit vector means at a lowest address of said address range.

125. The router of claim 124 wherein said first address is divided into n address portions.

126. The router of claim 125 wherein said first address is a 32-bit address that is divided into four octets.

127. The router of claim 121 wherein said first pointers include at least one next hop pointer that is used to route a packet.

128. The router of claim 122 wherein said search engine includes a trie data structure that has n levels.

129. The router of claim 128 wherein said n levels of said trie data structure include trie leaf nodes representing non-overlapping address space.

130. The router of claim 128 wherein said trie data structure initially searches at a first level using a first address portion.

131. The router of claim 130 wherein said first address portion contains consecutive most significant bits of said address.

132. The router of claim 131 wherein said set bit counting means counts said set bits of said first bit vector means using said first address portion.

133. The router of claim 132 wherein said first pointers include next hop pointers and next bucket pointers.

134. The router of claim 133 wherein, if one of said next hop pointers is output by said next hop table, said search is terminated and said router routes a first packet based on said one of said next hop pointers.

135. The router of claim 134 further comprising:
a second bit vector means for representing address ranges of an address space using set bits, wherein said second bit vector means is associated with one of said next bucket pointers; and
a second next hop table means for storing first pointers for each of said set bits, wherein said second next hop table is associated with one of said next bucket pointers.

136. The router of claim 135 wherein, if said first pointer is said one of said next bucket pointers, said set bit counting means counts set bits in said second bit vector means based on a second address portion.

137. The router of claim 136 wherein said second next hop table means outputs one of a next hop pointer and a next bucket pointer based on a second number of set bits counted by said set bit counting means.

138. The router of claim 137 further comprising additional bit vectors and next hop tables that are associated with next bucket pointers in lower levels of said trie data structure.

139. The router of claim 121 further comprising an enhanced bit vector that includes p counters and p partial length bit vectors, wherein each of said counters is associated with one of said partial length bit vectors.

140. The router of claim 139 wherein said counters are 8-bit counters and said partial length bit vectors include 24-bits.

141. The router of claim 140 wherein said enhanced bit vector allows a bit vector that is wider than memory bus width to be read in a single memory cycle.

142. The router of claim 121 further comprising a single line compressed bit vector that includes indices of set bits of a bit vector.

143. The router of claim 142 wherein said single line compressed bit vector includes 32 bits and is capable of representing 256-bit bit vectors having less than 6 set bits.

144. The router of claim 142 further comprising a double line compressed bit vector that includes indices of set bits of a bit vector.

145. The router of claim 144 wherein said double line compressed bit vector includes 64 bits and is capable of representing 256-bit bit vectors with less than 11 set bits.

146. The router of claim 144 wherein said pointers further include single and double line compressed pointers.

147. The router of claim 121 wherein said search engine routes packets using IP addresses.

148. The router of claim 121 wherein said first bit counting means counts set bits in said first bit vector means from a least significant bit of said first bit vector means to a bit position in said first bit vector means that is equal to an address of a packet.

149. The router of claim 121 wherein said search engine is implemented using software that is executed by a processor and memory.

150. The router of claim 121 wherein said search engine is implemented in a network switch.

151. A network device including a packet processor with a longest prefix matching search engine, comprising:
a first bit vector including set bits representing address ranges of an address space;

a set bit counter that counts said set bits in said bit vector based on a first address; and a first next hop table containing first pointers for each of said set bits, wherein one of said first pointers is selected based on a number of set bits counted by said set bit counters, wherein said first bit vector includes;

a plurality of lines each including an address portion that includes said set bits; and a counter portion that includes a number of said set bits in a previous line of said first bit vector.

152. The network device of claim 151 wherein said address ranges are associated with an address prefix.

153. The network device of claim 152 wherein each of said sets bit is associated with one of said address ranges.

154. The network device of claim 152 wherein said set bit represents an address range of said prefix and wherein said set bit is positioned in said bit vector at a lowest address of said address range.

155. The network device of claim 154 wherein said first address is divided into n address portions.

156. The network device of claim 155 wherein said first address is a 32-bit address that is divided into four octets.

157. The network device of claim 151 wherein said first pointers include at least one next hop pointer that is used to route a packet.

158. The network device of claim 152 wherein said search engine includes a trie data structure that has n levels.

159. The network device of claim 158 wherein said n levels of said trie data structure include trie leaf nodes representing non-overlapping address space.

160. The network device of claim 158 wherein said trie data structure initially searches at a first level using a first address portion.

161. The network device of claim 160 wherein said first address portion contains consecutive most significant bits of said address.

162. The network device of claim 161 wherein said set bit counter counts said set bits of said first bit vector using said first address portion.

163. The network device of claim 162 wherein said first pointers include next hop pointers and next bucket pointers.

164. The network device of claim 163 wherein, if one of said next hop pointers is output by said next hop table, said search is terminated and a router routes a first packet based on said one of said next hop pointers.

165. The network device of claim 164 further comprising:
a second bit vector that is associated with one of said next bucket pointers; and
a second next hop table that is associated with one of said next bucket pointers.

166. The network device of claim 165 wherein, if said first pointer is said one of said next bucket pointers, said set bit counter counts set bits in said second bit vector based on a second address portion.

167. The network device of claim 166 wherein said second next hop table outputs one of a next hop pointer and a next bucket pointer based on a second number of set bits counted by said set bit counter.

168. The network device of claim 167 further comprising additional bit vectors and next hop tables that are associated with next bucket pointers in lower levels of said trie data structure.

169. The network device of claim 151 further comprising an enhanced bit vector that includes p counters and p partial length bit vectors, wherein each of said counters is associated with one of said partial length bit vectors.

170. The network device of claim 169 wherein said counters are 8-bit counters and said partial length bit vectors include 24-bits.

171. The network device of claim 170 wherein said enhanced bit vector allows a bit vector that is wider than memory bus width to be read in a single memory cycle.

172. The network device of claim 151 further comprising a single line compressed bit vector that includes indices of set bits of said first bit vector.

173. The network device of claim 172 wherein said single line compressed bit vector includes 32 bits and is capable of representing 256-bit bit vectors having less than 6 set bits.

174. The network device of claim 172 further comprising a double line compressed bit vector that includes indices of set bits of said first bit vector.

175. The network device of claim 174 wherein said double line compressed bit vector includes 64 bits and is capable of representing 256-bit bit vectors with less than 11 set bits.

176. The network device of claim 174 wherein said pointers further include single and double line compressed pointers.

177. The network device of claim 151 wherein said search engine routes packets using IP addresses.

178. The network device of claim 151 wherein said first bit counter counts set bits in said first bit vector from a least significant bit of said first bit vector to a bit position in said first bit vector that is equal to an address of a packet.

179. The network device of claim 151 wherein said search engine is implemented using software that is executed by a processor and memory.

180. The network device of claim 151 wherein said address ranges are associated with IP addresses of a packet header and at least one other field of said packet header.

181. A network device including a packet processor with a longest prefix matching search engine, comprising:

first bit vector means for representing address ranges of an address space using set bits;

set bit counting means for counting said set bits in said first bit vector means based on a first address; and first next hop table means for storing first pointers for each of said set bits, wherein one of said first pointers is selected based on a number of set bits counted by said set bit counting means, wherein said first bit vector means includes:

a plurality of lines each including an address portion that includes said set bits; and a counter portion that includes a number of said set bits in a previous line of said first bit vector.

182. The network device of claim 181 wherein said address ranges are associated with an address prefix.

183. The network device of claim 182 wherein each of said sets bits is associated with one of said address ranges.

184. The network device of claim 182 wherein said set bit represents an address range of said prefix and wherein said set bit is positioned in said bit vector means at a lowest address of said address range.

185. The network device of claim 184 wherein said first address is divided into n address portions.

186. The network device of claim 185 wherein said first address is a 32-bit address that is divided into four octets.

187. The network device of claim 181 wherein said first pointers include at least one next hop pointer that is used to route a packet.

188. The network device of claim 182 wherein said search engine includes a trie data structure that has n levels.

189. The network device of claim 188 wherein said n levels of said trie data structure include trie leaf nodes representing non-overlapping address space.

190. The network device of claim 188 wherein said trie data structure initially searches at a first level using a first address portion.

191. The network device of claim 190 wherein said first address portion contains consecutive most significant bits of said address.

192. The network device of claim 191 wherein said set bit counting means counts said set bits of said first bit vector means using said first address portion.

193. The network device of claim 192 wherein said first pointers include next hop pointers and next bucket pointers.

194. The network device of claim 193 wherein, if one of said next hop pointers is output by said next hop table, said search is terminated and said router routes a first packet based on said one of said next hop pointers.

195. The network device of claim 194 further comprising:
- a second bit vector means for representing address ranges of an address space using set bits, wherein said second bit vector means is associated with one of said next bucket pointers; and
- a second next hop table means for storing first pointers for each of said set bits, wherein said second next hop table is associated with one of said next bucket pointers.

196. The network device of claim 195 wherein, if said first pointer is said one of said next bucket pointers, said set bit counting means counts set bits in said second bit vector means based on a second address portion.

197. The network device of claim 196 wherein said second next hop table means outputs one of a next hop pointer and a next bucket pointer based on a second number of set bits counted by said set bit counting means.

198. The network device of claim 197 further comprising additional bit vectors and next hop tables that are associated with next bucket pointers in lower levels of said trie data structure.

199. The network device of claim 181 further comprising an enhanced bit vector that includes p counters and p partial length bit vectors, wherein each of said counters is associated with one of said partial length bit vectors.

200. The network device of claim 199 wherein said counters are 8-bit counters and said partial length bit vectors include 24-bits.

201. The network device of claim 200 wherein said enhanced bit vector allows a bit vector that is wider than memory bus width to be read in a single memory cycle.

202. The network device of claim 181 further comprising a single line compressed bit vector that includes indices of set bits of a bit vector.

203. The network device of claim 202 wherein said single line compressed bit vector includes 32 bits and is capable of representing 256-bit bit vectors having less than 6 set bits.

204. The network device of claim 202 further comprising a double line compressed bit vector that includes indices of set bits of a bit vector.

205. The network device of claim 204 wherein said double line compressed bit vector includes 64 bits and is capable of representing 256-bit bit vectors with less than 11 set bits.

206. The network device of claim 204 wherein said pointers further include single and double line compressed pointers.

207. The network device of claim 181 wherein said search engine routes packets using IP addresses.

208. The network device of claim 181 wherein said first bit counting means counts set bits in said first bit vector means from a least significant bit of said first bit vector means to a bit position in said first bit vector means that is equal to an address of a packet.

209. The network device of claim 181 wherein said search engine is implemented using software that is executed by a processor and memory.

210. The network device of claim 181 wherein said search engine is implemented in a network switch.

* * * * *

UNITED STATES PATENT AND TRADEMARK OFFICE
CERTIFICATE OF CORRECTION

| | | |
|---|---|---|
| PATENT NO. | : 7,212,531 B1 | Page 1 of 1 |
| APPLICATION NO. | : 10/167005 | |
| DATED | : May 1, 2007 | |
| INVENTOR(S) | : Yaniv Kopelman et al. | |

It is certified that error appears in the above-identified patent and that said Letters Patent is hereby corrected as shown below:

Title Page, Line 7        In the "Abstract" delete "a" after "address of the"
Column 6, Line 49        Delete "design" and insert --designed--

Signed and Sealed this

Seventeenth Day of July, 2007

JON W. DUDAS
*Director of the United States Patent and Trademark Office*